(12) United States Patent
Scheer et al.

(10) Patent No.: US 11,858,660 B2
(45) Date of Patent: Jan. 2, 2024

(54) TRANSLATING DRIVE DEVICES, SYSTEMS AND METHODS FOR CARGO HANDLING SYSTEM

(71) Applicant: Goodrich Corporation, Charlotte, NC (US)

(72) Inventors: Dustin Scheer, Jamestown, ND (US); Aaron Roberts, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 513 days.

(21) Appl. No.: 17/141,645

(22) Filed: Jan. 5, 2021

(65) Prior Publication Data

US 2022/0212812 A1 Jul. 7, 2022

(51) Int. Cl.
*B64D 9/00* (2006.01)
*B64C 1/22* (2006.01)
*B64F 1/32* (2006.01)

(52) U.S. Cl.
CPC .................... *B64F 1/322* (2020.01)

(58) Field of Classification Search
CPC ..... B64D 9/00; B64D 2009/006; B64F 1/322; B60P 1/02; B64C 1/22
See application file for complete search history.

(56) References Cited

U.S. PATENT DOCUMENTS

| 5,101,962 | A | * | 4/1992 | Pritchard | B64D 9/00 |
| | | | | | 198/782 |
| 6,517,028 | B2 | * | 2/2003 | Huber | B64D 9/003 |
| | | | | | 410/82 |
| 6,547,061 | B2 | | 4/2003 | Gasal et al. | |
| 7,785,056 | B2 | * | 8/2010 | Sanford | B64D 9/00 |
| | | | | | 414/535 |
| 8,066,459 | B2 | * | 11/2011 | Schulze | B64C 1/20 |
| | | | | | 410/80 |
| 9,079,665 | B2 | * | 7/2015 | Larson | B64D 9/003 |
| 9,284,130 | B1 | * | 3/2016 | Himmelmann | B60V 3/025 |
| 9,694,978 | B2 | * | 7/2017 | Harms | B64D 9/00 |
| 10,059,450 | B2 | | 8/2018 | Levron | |
| 10,086,943 | B2 | * | 10/2018 | Schoen | B65G 39/025 |
| 10,202,065 | B2 | * | 2/2019 | Koehler | B60P 7/13 |
| 10,399,661 | B2 | | 9/2019 | Lampe et al. | |
| 10,814,982 | B2 | | 10/2020 | Brown et al. | |
| 11,618,640 | B2 | * | 4/2023 | Sjostrom | B64D 9/00 |
| | | | | | 701/3 |
| 2017/0106967 | A1 | | 4/2017 | Lampe et al. | |

FOREIGN PATENT DOCUMENTS

| DE | 10/2017 128 238 | * 11/2018 |
| EP | 3345833 | 7/2018 |
| WO | 2014049590 | 4/2014 |

OTHER PUBLICATIONS

US 2023/0036351 A1, Harms et al., Feb. 2, 2023.*
European Patent Office, European Search Report dated May 16, 2022 in Application No. 21218192.9.

* cited by examiner

*Primary Examiner* — Douglas A Hess
(74) *Attorney, Agent, or Firm* — SNELL & WILMER L.L.P.

(57) ABSTRACT

A translating drive unit (TDU) may comprise: a housing; a plurality of guide rollers coupled to the housing; a drive system coupled to the housing, the drive system configured to translate the housing in a longitudinal direction; and a retractable pawl coupled to the housing.

17 Claims, 16 Drawing Sheets

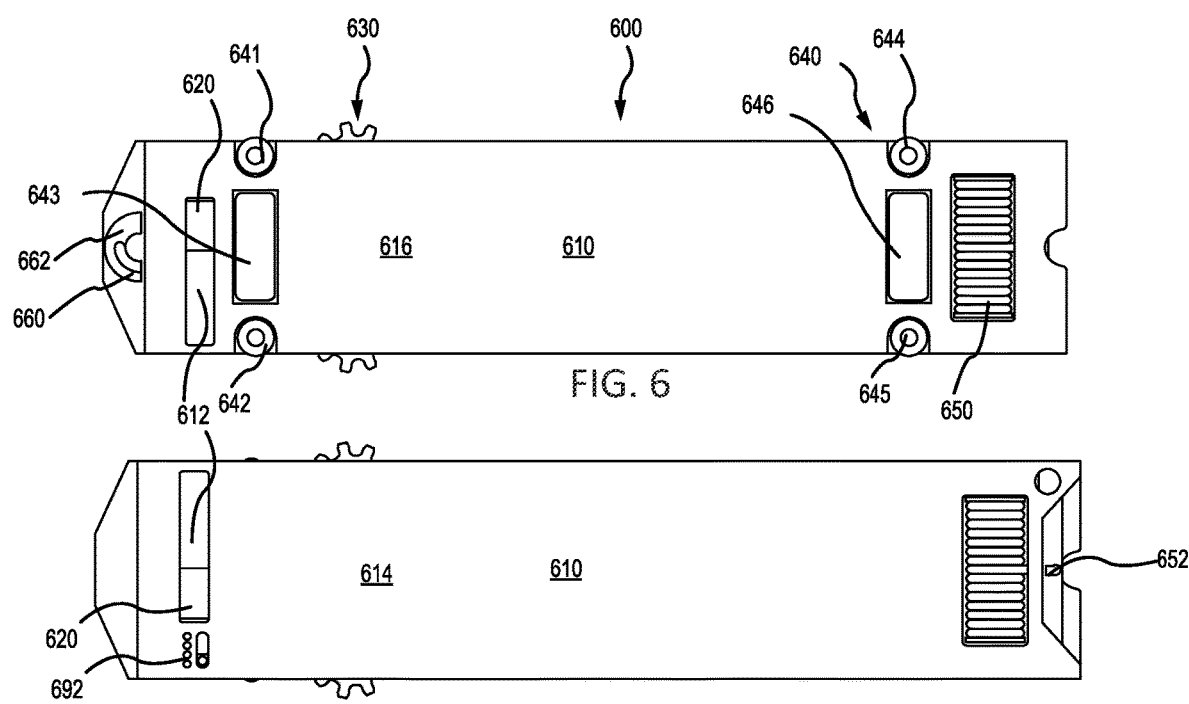

TRANSLATING DRIVE DEVICES, SYSTEMS AND METHODS FOR CARGO HANDLING SYSTEM

FIELD

The present disclosure relates generally to cargo handling systems and, more particularly, to translating drive devices, systems, and methods for cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include fixed traction motors located throughout the doorway and longitudinal areas of a cargo compartment.

SUMMARY

A translating drive unit (TDU) is disclosed herein. The TDU may comprise: a housing; a plurality of guide rollers coupled to the housing; a drive system coupled to the housing, the drive system configured to translate the housing in a longitudinal direction; and a retractable pawl coupled to the housing.

In various embodiments, the drive system may include: a first gear extending outward from a first lateral side of the housing, and a second gear extending outward from a second lateral side of the housing. The plurality of guide rollers may include a first vertical roller disposed on the first lateral side of the housing, a second vertical roller disposed on the second lateral side of the housing, and a first horizontal roller disposed between the first vertical roller and the second vertical roller. The plurality of guide rollers may further comprise: a third vertical roller disposed on the first lateral side of the housing and spaced apart longitudinally from the first vertical roller; a fourth vertical roller disposed on the second lateral side of the housing and spaced apart longitudinally from the second vertical roller; and a second horizontal roller spaced apart longitudinally from the first horizontal roller. The TDU may further comprise a power source disposed within the housing. The power source may be a plurality of cells disposed within the housing. The retractable pawl may be pivotably coupled to the housing. The TDU may further comprise a first cable disposed at a first longitudinal end of the housing. The TDU may further comprise a coupling mechanism disposed at a second longitudinal end of the housing, the coupling mechanism configured to couple the TDU to a second cable of an adjacent TDU.

A translating drive unit (TDU) is disclosed herein. The TDU may comprise: a housing; a drive system operably coupled to the housing; a retractable pawl operably coupled to the housing; and a controller operable to: command the drive system to translate the TDU longitudinally along a cargo compartment; and command the retractable pawl to transition from a retracted state to an extended state, the extended state having the retractable pawl disposed vertically above a surface of the housing.

In various embodiments, the TDU may further comprise a sensor, wherein the sensor comprises at least one of a unit load device (ULD) sensor disposed on the surface of the housing and a light detection and ranging (LiDAR) sensor. The controller may further be operable to receive from the ULD sensor an indication whether a ULD is disposed above the TDU. The drive system may further comprise a first gear extending outward from a first lateral side of the housing and a second gear extending outward from a second lateral side of the housing. The controller may further be operable to command the first gear and the second gear to rotate and translate the TDU longitudinally along the cargo compartment. The TDU may further comprise a coupling mechanism disposed at a first longitudinal end of the housing and a cable disposed at a second longitudinal end of the housing. The controller may further be operable to command the coupling mechanism to actuate to couple the TDU to an adjacent TDU.

A translating drive system for a cargo handling system is disclosed herein. The translating drive system may comprise: a first roller tray having a first plurality of rollers disposed therein, the first roller tray extending longitudinally through a cargo compartment; a second roller tray having a second plurality of roller disposed therein, the second roller tray spaced apart laterally from the first roller tray; a first translating drive unit (TDU) disposed between the first roller tray and the second roller tray, the first TDU having a first retractable pawl configured to extend above a first surface of a housing of the TDU, the first TDU including a first drive system configured to translate the first TDU longitudinally through the cargo compartment; and a second TDU disposed between the first roller tray and the second roller tray and spaced apart longitudinally from the first TDU, the second TDU including a second retractable pawl configured to extend above a second surface of the housing of the first TDU, the second TDU including a second drive system configured to translate the second TDU longitudinally through the cargo compartment.

In various embodiments, the first TDU may be configured to couple to the second TDU via a coupling mechanism and cable. The first TDU may include a first transceiver and the second TDU includes a second transceiver. The translating drive system may comprise a main controller, wherein the first TDU is configured to receive instructions through the first transceiver from the main controller, and wherein the second TDU is configured to receive instructions through the second transceiver from the main controller.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 6 illustrates a top down view of a translating drive unit (TDU), in accordance with various embodiments;

FIG. 7 illustrates a bottom up view of a TDU, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
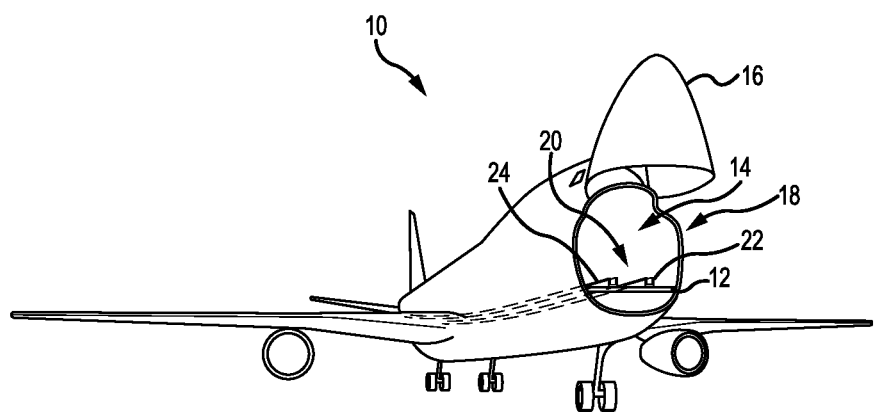
FIGS. 1A and 1B illustrate schematic views of a cargo handling system, in accordance with various embodiments.
Figure 1B:
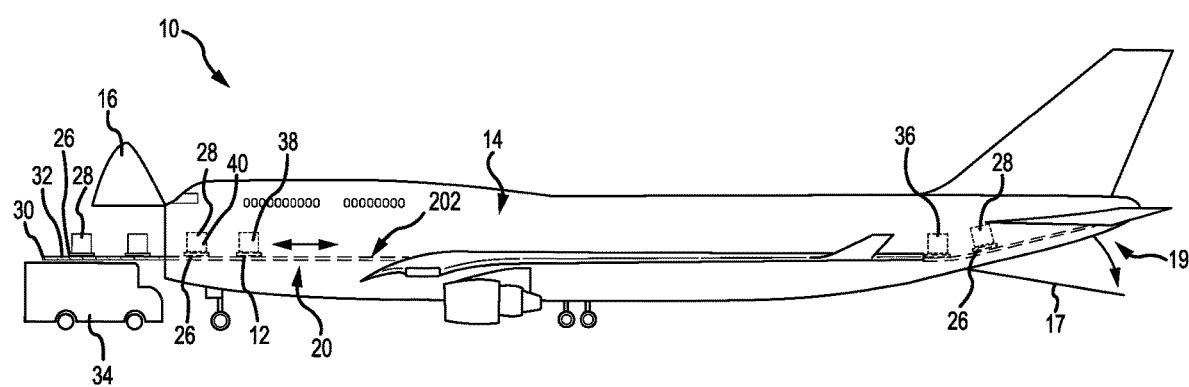

With reference to FIGS. 1A and 1B, a schematic view of an aircraft 10 having a cargo deck 12 located within a cargo compartment 14 is illustrated, in accordance with various embodiments. The aircraft 10 may comprise a cargo load door 16 located, for example, at a forward end of the aircraft 10 and configured to rotate upward (as illustrated in FIG. 1A) or sideways to expose an opening 18 that provides access to the cargo compartment 14. In various embodiments, a second cargo load door 17 may be located at other portions of the aircraft 10, such as, for example, at an aft end of the aircraft 10 and configured to rotate downward (as illustrated in FIG. 1B) and provide a second opening 19 to gain access to the cargo compartment 14. Inside the cargo compartment 14, one or more trays 20, e.g., a first tray 22 and a second tray 24, extend generally from the fore end of the aircraft 10 to the aft end of the aircraft 10. As described more fully below, the one or more trays 20 provide a support structure for which a platform 26 may transit along a length of the aircraft 10 between the fore end and the aft end and carry a ULD or some other form of cargo carrier, such as, for example, a container of a size typically used for ocean-going transport by ship or truck. Without loss of generality, a cargo load 28 of any size or shape, which may include objects within containers or ULDs or objects not within containers or ULDs, such as, for example, automobiles or the like, will be considered herein as configured for transport on the platform 26.

Still referring to FIGS. 1A and 1B, in various embodiments, the one or more trays 20, during loading or unloading of the cargo load 28, may be connected to a loading structure 30 which, in various embodiments, may comprise one or more trays 32 that correspond to the one or more trays 20 extending along the cargo deck 12 of the aircraft 10. In various embodiments, the loading structure 30 may be attached to an elevated structure, such as, for example, a truck 34 (as illustrated in FIG. 1B) or a scissor lift or a loading dock or the like, such that the one or more trays 20 and the loading structure 30 are located substantially at the same elevation and configured to transition a platform 26 either onto or off from the one or more trays 20. For example, a first cargo load 36 may be transitioned from the loading structure 30, through the opening 18 and onto the one or more trays 20, and then along the one or more trays 20 to the aft end of the aircraft, where the first cargo load is secured for transport. A second cargo load 38 may be followed by a third cargo load 40 and so on until the cargo deck 12 is filled to a desired capacity with cargo. After the aircraft 10 has reached its destination, each cargo load, such as, for example, the first cargo load 36, the second cargo load 38 and the third cargo load 40 are unloaded from the aircraft 10 in similar fashion, but in a reverse sequence to the loading procedure. To ensure cargo loads are restrained, the aircraft 10 may include a restraint assembly as described herein and in accordance with various embodiments.

Typical cargo handling systems may include multiple fixed Power Drive Units (PDUs), which rely on friction to provide ULD drive force. Having a cargo handling system with a drive system based on friction may make it difficult to achieve traction under wet and/or other adverse conditions. A friction interface may also result in wear of both a drive tire for a respective PDU, as well as a baseplate for a respective ULD.

A minimum number of PDUs for a typical cargo handling system may be a function of length and size of a cargo compartment and dimensions of a base plate for a respective ULD. Other factors that may drive the quantity of PDUs in a typical cargo handling system may be duty cycle limitations of a respective PDU, drive force capability of a respective PDU, redundancy of PDUs to affect system level characteristics for schedule interrupt. Each of these factors may combine to drive weight and cost into a typical cargo handling system.

Additionally, typical cargo handling systems with fixed PDUs that are located closer to the doorway area may experience a greater usage, and thus an amount of wear, relative to the fixed PDUs disposed towards an end of the cargo compartment. In this regard, a typical cargo handling system with fixed PDUs may have a greater number of fixed PDUs proximate the doorway to account for wear during the life of the typical cargo handling system, driving weight and cost into the typical cargo handling system and/or derivative platforms of typical cargo handling systems.

Additionally, typical cargo handling systems with fixed PDUs may be hard wired into the cargo handling system, which may involve a high level of system integration between a typical cargo handling sub-system and an aircraft platform, further driving cost and time for development of a typical cargo handling system.

Disclosed herein, in accordance with various embodiments, is an autonomous translating drive system having at least two translating drive units (TDUs). In various embodiments, a TDU in the autonomous translating drive system may include an independent power source, such as a battery or the like. In various embodiments, the autonomous translating drive system may include any linear actuator system. For example, the translating drive system may include a rack and pinion drive system, a chain drive system, a belt drive system, a rigid chain system, a rigid belt system, or the like.

In various embodiments, the autonomous translating drive system may include a first TDU and a second TDU. In various embodiments, the first TDU and the second TDU may be in electronic communication with each other. In various embodiments, the first TDU and the second TDU may be in electronic communication with a controller. In various embodiments, the first TDU and the second TDU may be configured to engage a ULD and translate the ULD longitudinally through a cargo compartment of an aircraft (e.g., cargo compartment 14 from FIGS. 1A and 1B). In various embodiments, the first TDU and the second TDU may each include a first drive gear and a second drive gear, each drive gear configured to interface with a rack (e.g., a rack disposed on a lateral surface of a roller tray (e.g., the one or more trays 20 of cargo deck 12 from FIGS. 1A and 1B).

Figure 2:
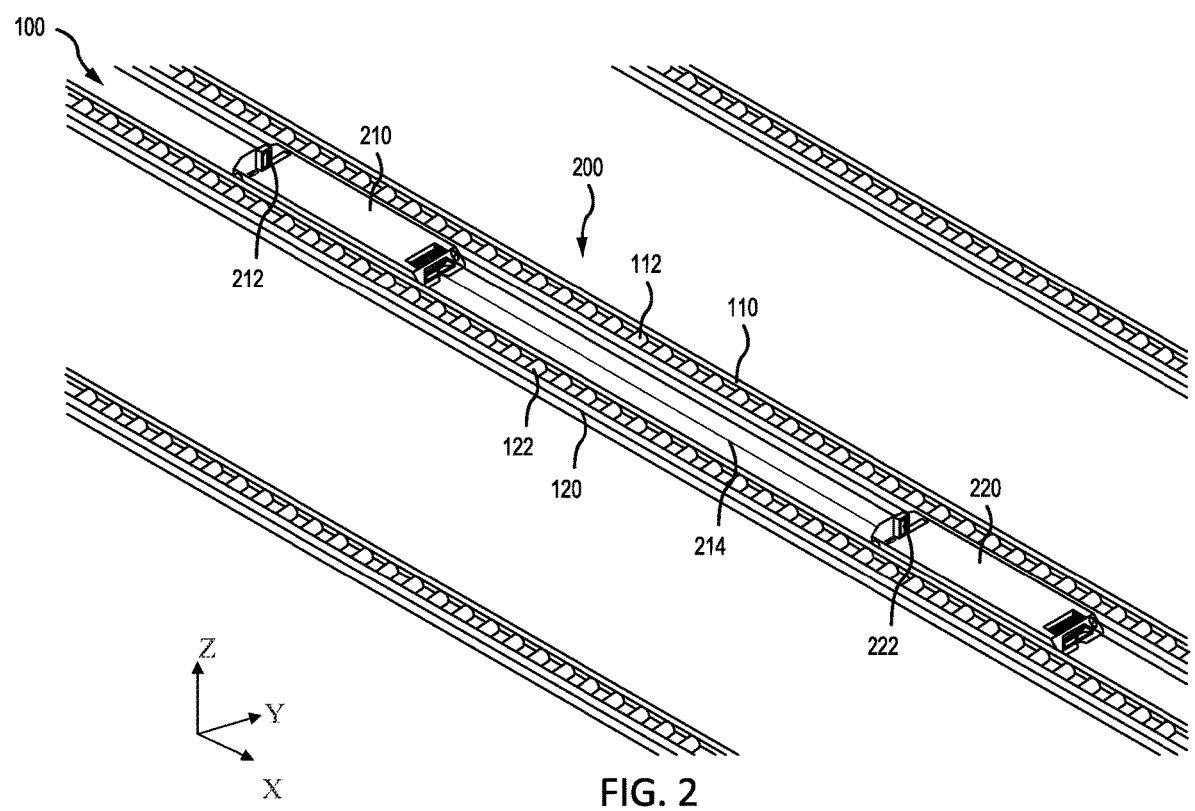
FIG. 2 illustrates a portion of a cargo handling system with a translating drive system, in accordance with various embodiments.

Referring now to FIG. 2, a portion of a cargo handling system 100 having a translating drive system 200 is illustrated, in accordance with various embodiments. The cargo handling system 100 is illustrated with reference to an XYZ coordinate system, with the X-direction extending longitudinally in an aft direction (and defining a longitudinal direction), the Y-direction extending perpendicular to the X-direction (and defining a lateral direction) and the Z-direction extending vertically, each direction being with respect to an aircraft in which the cargo handling system 100 is positioned, such as, for example, the aircraft 10 described above with reference to FIGS. 1A and 1B.

In various embodiments, the cargo handling system 100 may define a first tray 110 extending longitudinally in the aft direction (i.e., the X-direction) and a second tray 120 extending longitudinally in the aft direction (i.e., the X-direction). The first tray 110 and the second tray 120 may be spaced apart laterally (i.e., the Y-direction) from each other. The first tray 110 may include a first plurality of rollers 112, and the second tray 120 may include a second plurality of rollers 122. Each roller in the first tray 110 extends laterally from a first lateral side of the first tray 110 to a second lateral side of the first tray 110. Similarly, each roller in the second tray 120 extends laterally from a first lateral side of the second tray 120 to a second lateral side of the second tray 120.

In various embodiments, the translating drive system 200 includes a first TDU 210 and a second TDU 220. The first TDU 210 may be spaced apart longitudinally (i.e., the X-direction) from the second TDU 220. In various embodiments, the first TDU 210 is configured to couple to the second TDU 220, as described further herein. In various embodiments, the first TDU 210 includes a first retractable pawl 212 and the second TDU 220 includes a second retractable pawl 222. In various embodiments, the first TDU 210 and the second TDU 220 may be configured to provide a clamping force (i.e., between the first retractable pawl 212 and the second retractable pawl 222) to a respective ULD and translate the respective ULD longitudinally along the first plurality of rollers 112 and the second plurality of rollers 122.

In various embodiments, the first TDU 210 may be configured to couple the first TDU 210 to a longitudinally adjacent TDU (e.g., the second TDU 220). For example, if additional force for translating and/or controlling a ULD is detected/determined by the first TDU 210, or a controller, the first TDU 210 may be coupled to the second TDU 220 via a cable 214. In various embodiments, the cable 214 may be stowed in the first TDU 210 in response to not being in use (i.e., when the first TDU 210 is uncoupled from an adjacent TDU), as described further herein.

Figure 3:
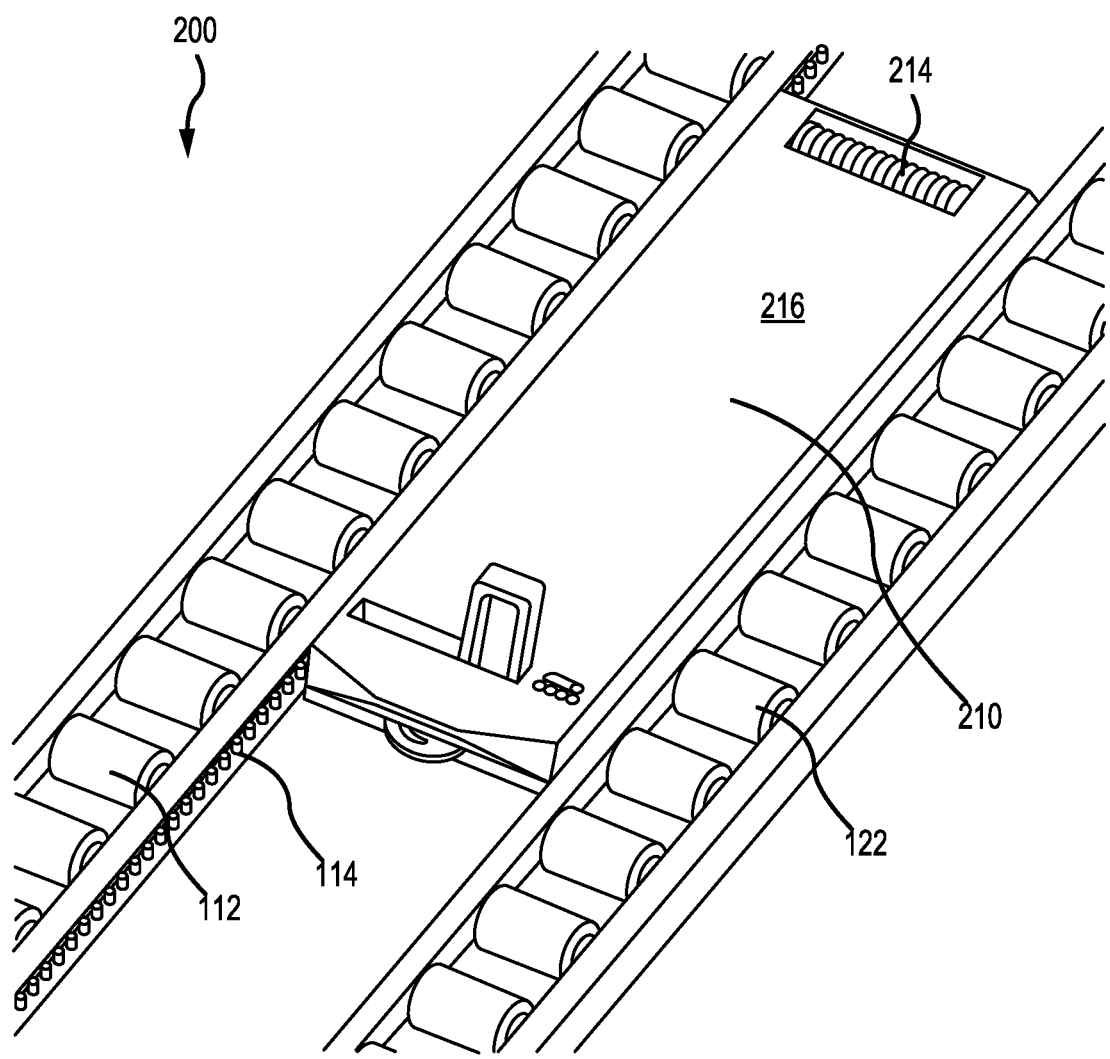
FIG. 3 illustrates a portion of a cargo handling system with a translating drive system, in accordance with various embodiments.

In various embodiments, the first TDU 210 and the second TDU 220 may be configured to operate independently of one another. For example, with brief reference to FIG. 3, the first TDU 210 in an un-coupled state is illustrated, in accordance with various embodiments. In the un-coupled state, the cable 214 may be stowed at least partially in a housing 216 of the first TDU 210 by any method known in the art, such as coiled, or the like. In various embodiments, the first TDU 210 may be configured to translate a ULD longitudinally along the first plurality of rollers 112 and the second plurality of rollers 122 alone. For example, the first retractable pawl 212 of the first TDU 210 is configured to interface with a side of a ULD and the first TDU 210 is configured to translate longitudinally and push the ULD at a ULD/retractable pawl interface, in accordance with various embodiments, as described further herein.

Figure 4:
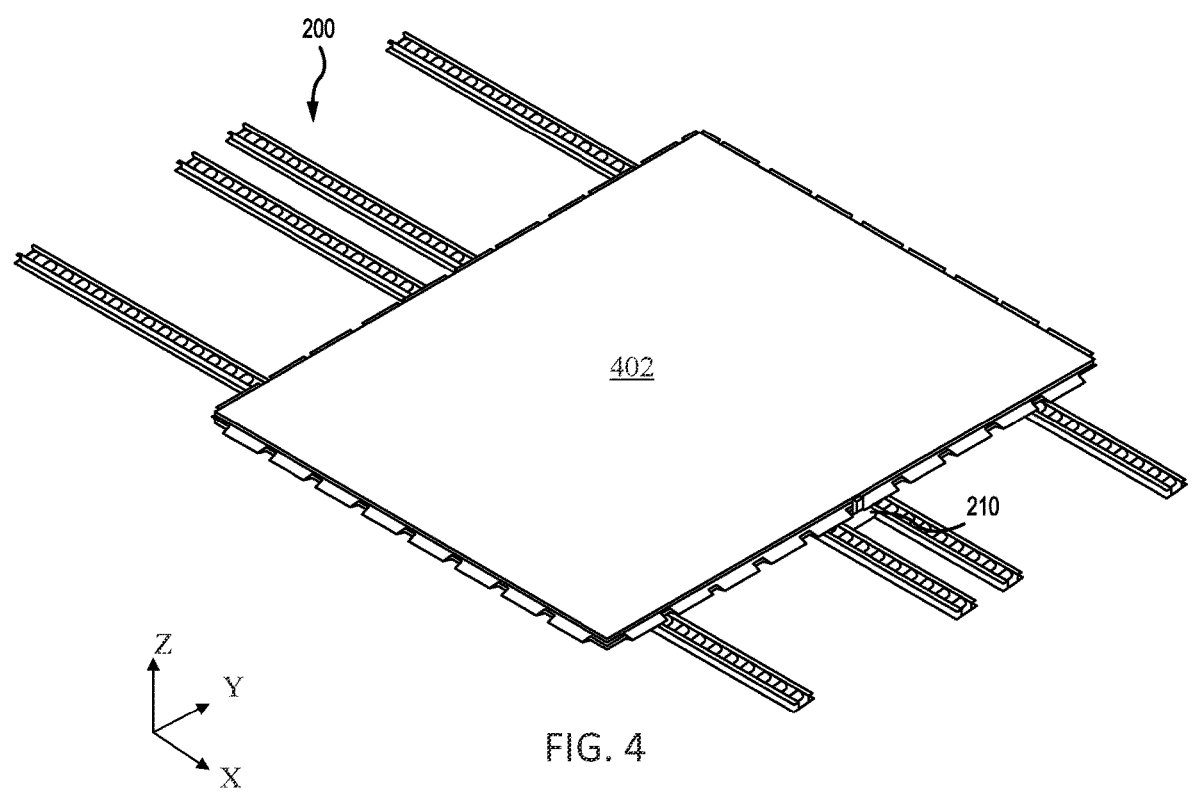
FIG. 4 illustrates a portion of a cargo handling system with a translating drive system, in accordance with various embodiments.
Figure 5:
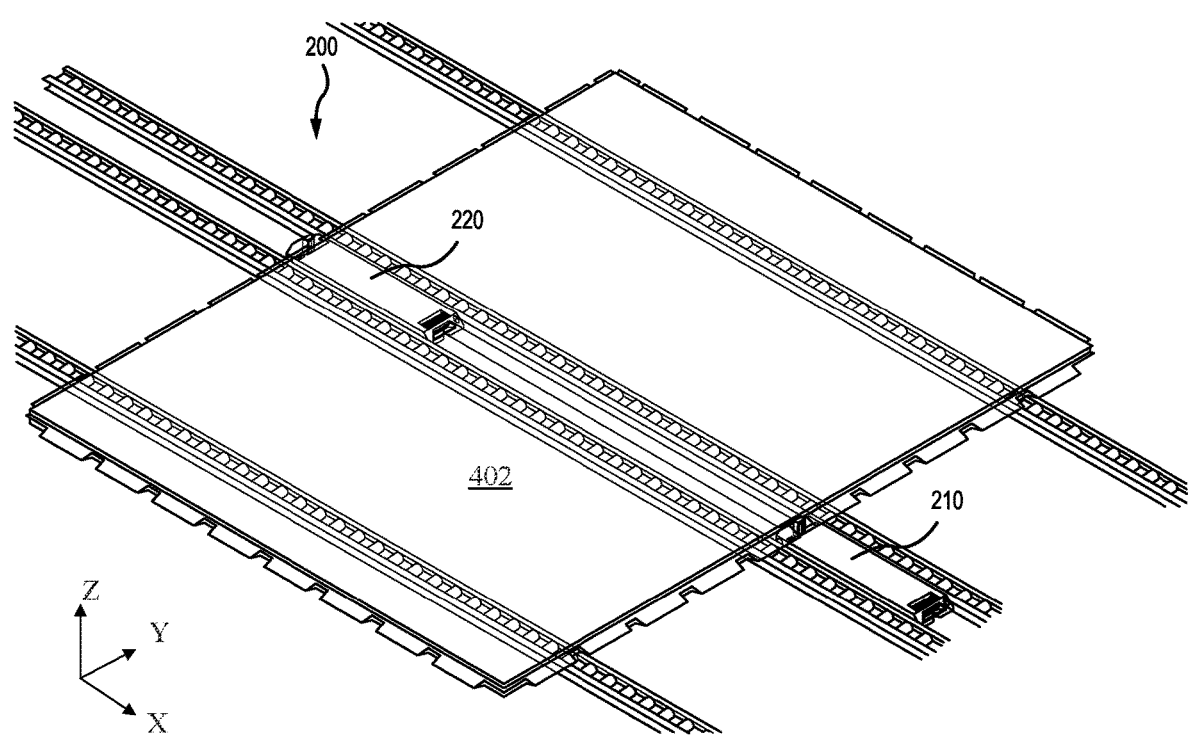
FIG. 5 illustrates a portion of a cargo handling system with a translating drive system, in accordance with various embodiments.

Referring now to FIGS. 4 and 5, any number of TDUs may be utilized to translate a cargo unit (e.g., a ULD 402) in accordance with various embodiments. For example, as shown in FIG. 4, a single TDU (e.g., first TDU 210) may push the ULD 402 on a first side of the ULD 402 in a longitudinal direction (e.g., the X-direction) during loading or unloading. Similarly, as shown in FIG. 5, the first TDU 210 and the second TDU 220 may be configured to clamp the ULD 402 longitudinally (e.g., in the X-direction) to control the forward and aft sides of the ULD 402. In this regard, with two TDUs, as shown in FIG. 5, the translating drive system 200 may provide greater control of the ULD 402 in the forward and aft directions and/or provide greater force in response to a single TDU being unable to provide enough force to translate the ULD 402, in accordance with various embodiments.

In various embodiments, TDUs may also be disposed at lateral sides of the ULD. In this regard, the additional TDUs may provide lateral stability to the ULD 402, in accordance with various embodiments.

Referring now to FIGS. 6 and 7, a top down view (FIG. 6) and a bottom up view (FIG. 7) of a TDU 600, in accordance with various embodiments, is illustrated. In various embodiments, the first TDU 210 and the second TDU 220 from FIGS. 2-5 may be in accordance with the TDU 600. In various embodiments, each TDU in a translating drive system (e.g., translating drive system 200 from FIG. 2) may be in accordance with the TDU 600.

The TDU 600 comprises a housing 610 and a retractable pawl 620. In various embodiments, the housing 610 includes a slot 612 disposed therethrough. In various embodiments, the slot 612 includes the retractable pawl 620 disposed therein. In various embodiments, the retractable pawl 620 is configured to extend vertically above a first surface 614 of the housing (e.g., a top surface). In various embodiments, the retractable pawl 620 may pivot about a pivot point and extend above the first surface 614. Although described herein as being pivotably coupled, the retractable pawl 620 may extend above the first surface 614 by any method known in the art, such as being hingedly coupled, slidingly coupled, or the like.

In various embodiments, the retractable pawl 620 may be actuated by an electric motor, spring loaded in either an extracted or retracted state, or the like. In various embodiments, the retractable pawl may include a manual release to disengage as a fail-safe for the TDU 600. In various embodiments, the retractable pawl 620 may further comprise a mating component for a cable, such as a hook or the like, as described further herein. The mating component may be configured to be coupled to a cable (e.g., cable 214 from FIG. 2. In various embodiments, the mating component may be coupled to a cable of a cargo handling system, such as a winch or the like, to pull the TDU and in turn pull the ULD (e.g., ULD 402 from FIGS. 4 and 5).

In various embodiments, the TDU 600 further comprises a drive system 630. In various embodiments, the drive system 630 of the TDU 600 is configured to propel the TDU in a longitudinal direction (e.g., the X-direction) between trays (e.g., trays 110, 120 from FIG. 2). Although described herein as including a rack and pinion drive system, the TDU 600 is not limited in this regard. For example, the drive system 630 may include a chain drive system, a belt drive system, a rigid chain system, a rigid belt system, or the like.

In various embodiments, the drive system 630 comprises a first gear 632. Although illustrated as also including a second gear 634, the present disclosure is not limited in this regard. For example, the drive system 630 may be configured to include only a single gear (e.g., first gear 632) on a first lateral side, and a roller disposed on an opposite lateral side, in accordance with various embodiments. The first gear 632 may be disposed on a first lateral side of the housing 610, and the second gear 634 may be disposed on a second lateral side of the housing 610, the second lateral side being opposite the first lateral side. The first gear 632 and the second gear 634 of the TDU 600 may be configured to interface with a rack (e.g., rack 114 of roller tray 110 from FIG. 3). In various embodiments, the rack 114 from FIG. 3 may comprise vertical pins, lateral slots, or the like.

In various embodiments, the TDU 600 may further comprise a plurality of guide rollers 640. In various embodiments, the plurality of guide rollers 640 are configured to guide the TDU 600 between adjacent trays (e.g., trays 110, 120 from FIG. 2) of a cargo handling system (e.g., cargo handling system 100 from FIG. 2). In various embodiments, the plurality of guide rollers 640 may include a first vertical roller 641, a second vertical roller 642, and a horizontal roller 643. In various embodiments, the first vertical roller 641 is disposed on a first lateral side of the housing 610 in a recess of a second surface 616 (e.g., a bottom surface) disposed opposite the first surface 614. Similarly, the second vertical roller 642 is disposed on a second lateral side of the housing 610 in a recess of the second surface 616, the second lateral side being opposite the first lateral side. In various embodiments, the horizontal roller 643 is disposed laterally between the first vertical roller 641 and the second vertical roller 642 in a recess of the second surface 616. In various embodiments, the vertical rollers 641, 642 are configured to interface with lateral sides of trays (e.g., trays 110, 120 from FIG. 2) in a cargo handling system 100 from FIG. 2 for guiding the TDU 600 laterally between the trays and ensure the drive system 630 remains on track. In various embodiments, the first horizontal roller 643 is configured to ensure the TDU 600 translates with ease on a cargo deck of a cargo compartment (e.g., cargo compartment 14 from FIG. 1A).

In various embodiments, the first vertical roller 641, the second vertical roller 642, and the first horizontal roller 643 may be disposed at a first longitudinal end of the TDU 600, and a third vertical roller 644, a fourth vertical roller 645, and a second horizontal roller 646 of the plurality of guide rollers 640 may be disposed at a second longitudinal end opposite the first longitudinal end. In various embodiments, the third vertical roller 644, the fourth vertical roller 645 and the second horizontal roller 646 may be in the same orientation as the first vertical roller 641, the second vertical roller 642, and the first horizontal roller 643 described previously herein.

Although illustrated, and described, herein as including two sets of vertical guide rollers and horizontal guide rollers, the present disclosure is not limited in this regard, For example, the TDU 600 could include a single set of guide rollers (e.g., vertical rollers 641, 642 and horizontal roller 643), two sets of guide rollers (e.g., first set of guide rollers 641, 642, 643 and second set of guide rollers 644, 645, 646), or multiple sets of guide rollers (e.g., greater than 2 sets of guide rollers).

In various embodiments, the TDU 600 further comprises a cable 650 and a coupling mechanism 660. In various embodiments, the cable 650 may be in a stowed position as illustrated in FIGS. 6 and 7 when the cable 650 is not in use. In various embodiments, the cable 650 may be configured to be coupled to an adjacent TDU (e.g., first TDU 210 being coupled to second TDU 220 from FIG. 2) via a coupling mechanism of the adjacent TDU (e.g., the coupling mechanism 660) in FIG. 6. In various embodiments, the coupling mechanism 660 may include a hook 662 configured to actuate about a central axis from an unlocked position to a locked position around a loop fitting 652 disposed at an end of the cable 650. Although illustrated as including an actuatable hook 662 and a loop fitting 652, one skilled in the art may recognize various ways to couple the cable 650 to an adjacent TDU (e.g., a draft gear and a draw gear or any other automatic coupler known in the art).

Figures 8A, 8B:
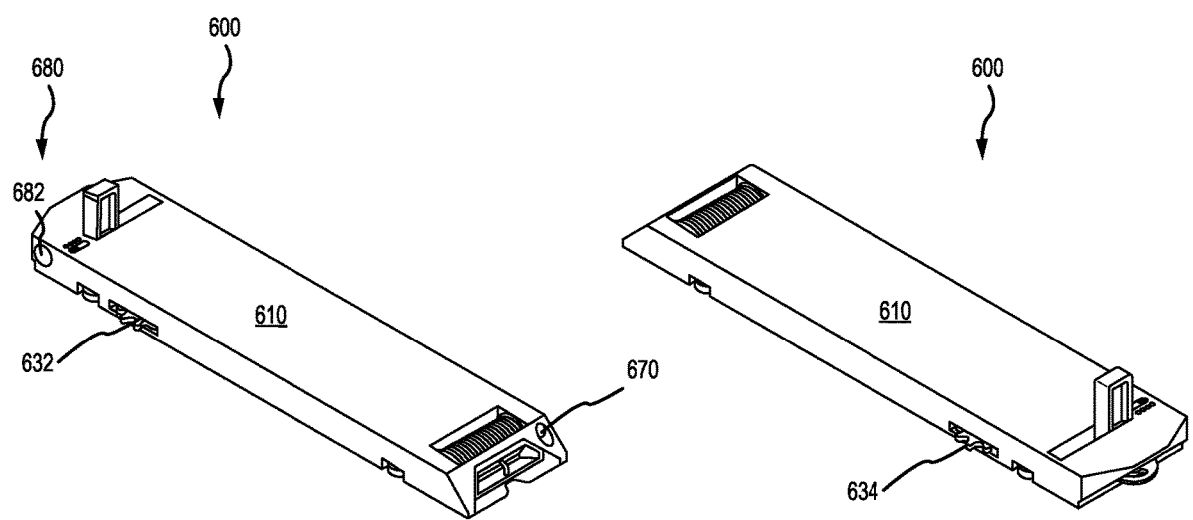
FIG. 8A illustrates a perspective view of a TDU, in accordance with various embodiments.
FIG. 8B illustrates a perspective view of a TDU, in accordance with various embodiments.

Referring now to FIGS. 8A and 8B, perspective views of the TDU 600 is illustrated, in accordance with various embodiments. In various embodiments, the gears 632, 634 may extend laterally outward from a respective lateral side of the housing 610. In this regard, the gears 632, 634 may be partially disposed within the housing 610.

In various embodiments, the TDU 600 further comprises a charging connector 670. The charging connector 670 may be electrically coupled to a power source disposed within the housing 610, as described further herein. In various embodiments, a power source of the TDU 600 may be charged via the charging connector 670 when the TDU 600 is not in use. Although illustrated as including a charging port, the TDU 600 may include a wireless charging system, in accordance with various embodiments. Although illustrated is including a charging connector 670 for recharging a power source, the present disclosure is not limited in this regard. For example, a replaceable power source, such as replaceable cells may be utilized as a power source, in accordance with various embodiments.

In various embodiments, the TDU 600 may further include a location detection system 680. In various embodiments, the location detection system 680 may include an electronic device 682, such as a radio frequency identification (RFID) reader, a camera, a position sensor, or the like. In various embodiments, the position sensor may be any position sensor, such as a structured light, audio (radar), or a light detection and ranging (LiDAR) sensor. In this regard, the LiDAR sensor may be configured to provide absolute positional reference of the TDU 600 to a controller (e.g., an aircraft controller or a TDU controller), in accordance with various embodiments. In various embodiments, a LiDAR sensor may further be capable of detecting foreign object debris on a cargo deck and provide a fault indication to a respective controller.

Figure 9:
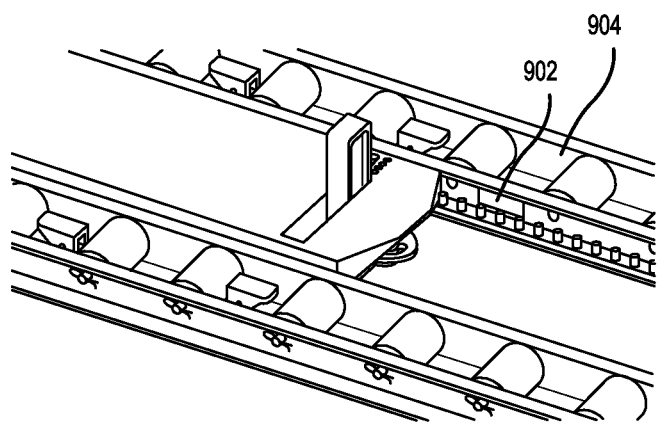
FIG. 9 illustrates a portion of a translating drive system, in accordance with various embodiments.

In various embodiments, the electronic device 682 is configured to communicate with a corresponding fixed electronic device along the trays (e.g., trays 110, 120 from FIG. 2) via a wireless protocol such as 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, a RFID protocol, a NFC protocol, or any other protocol capable of wireless transmissions. For example, with brief reference to FIG. 9, electronic devices 902 may be disposed on a lateral side of a tray 904 (e.g., trays 110, 120 from FIG. 2). In various embodiments, the electronic devices 902 may be spaced apart longitudinally along the tray 904 and be configured to provide positional data (i.e., location data in the longitudinal direction of the cargo compartment). In various embodiments, the electronic device 682 of the location detection system 680 may be configured to receive location data from the electronic devices 902 of the tray 904 from FIG. 9. In various embodiments, the electronic devices 902 may include, for example, a RFID tag, a key fob, a near field communication (NFC) transmitter, or the like.

Figure 10A:
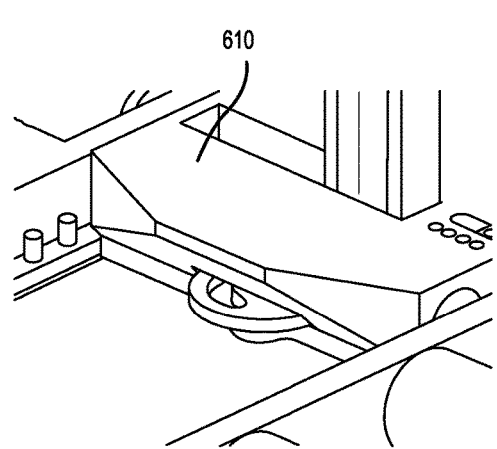
FIG. 10A illustrates a portion of a TDU, in accordance with various embodiments.
Figure 10B:
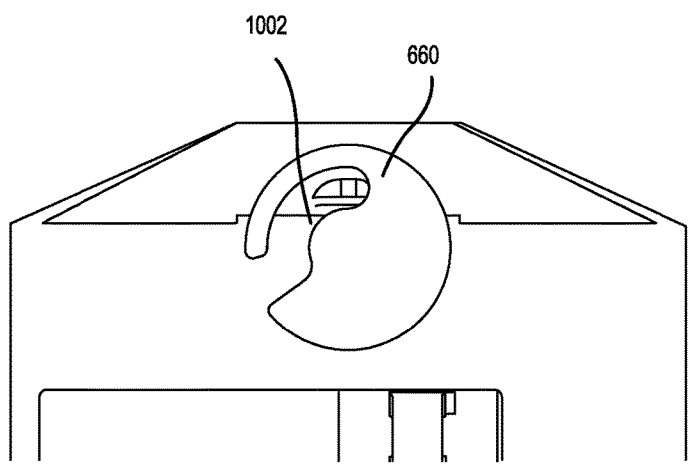
FIG. 10B illustrates a portion of a TDU, in accordance with various embodiments.

Referring now to FIGS. 10A and 10B, a detail view of the coupling mechanism 660 of the TDU 600 is illustrated, in accordance with various embodiments. In various embodiments, the coupling mechanism 660 may be annular in shape and include an arcuate slot 1002 disposed therein. The arcuate slot 1002 may be configured to a receive a loop fitting (e.g., loop fitting 652), as described previously herein. For example, the coupling mechanism 660 may be configured to rotate about a centerline defined in a vertical direction, allowing the arcuate slot to be disposed outward from the second surface 616 (e.g., the bottom surface). In this regard, the arcuate slot 1002 may be configured to receive the loop fitting and close to a position illustrated in FIGS. 10A and 10B, locking the loop fitting in the arcuate slot between the coupling mechanism 660 and the housing 610, in accordance with various embodiments.

Figure 11A:
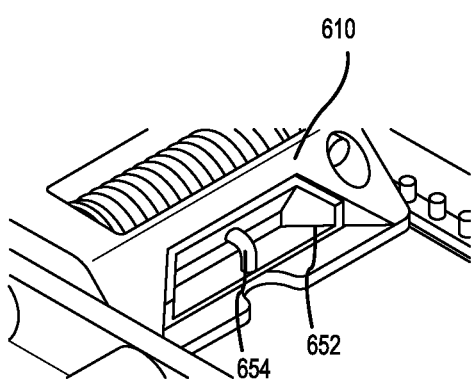
FIG. 11A illustrates a portion of a TDU, in accordance with various embodiments.
Figure 11B:
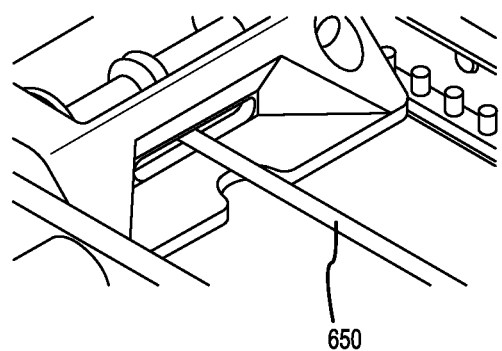
FIG. 11B illustrates a portion of a TDU, in accordance with various embodiments
Figure 12A:
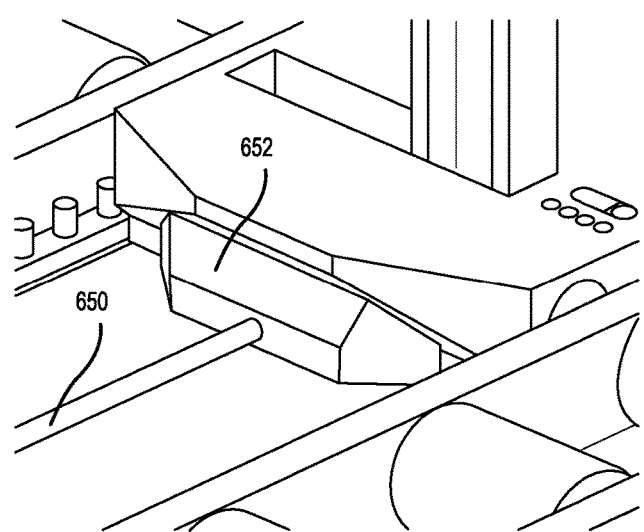
FIG. 12A illustrates a first TDU coupled to a second TDU, in accordance with various embodiments.
Figure 12B:
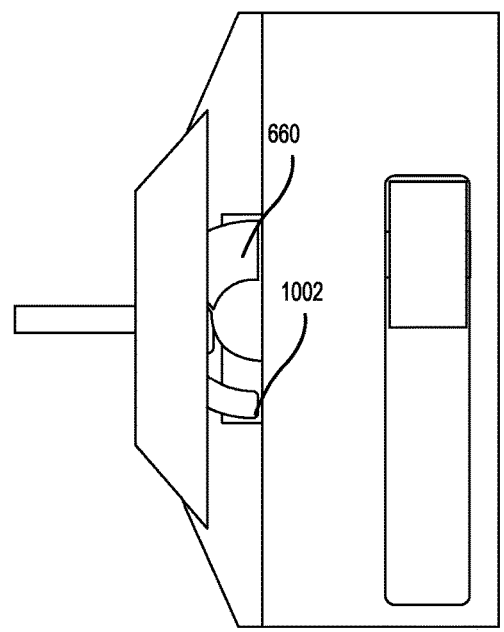
FIG. 12B illustrates a first TDU coupled to a second TDU, in accordance with various embodiments.

Referring now to FIGS. 11A and 11B, a cable 650 in a stowed position (FIG. 11A), and a portion of the cable 650 coupled to and adjacent TDU (FIG. 11B) is illustrated, in accordance with various embodiments. In various embodiments, in the stowed position (FIG. 11A), the loop fitting 652 is disposed in a receptacle of the housing 610. With combined reference to FIGS. 11A and 10A/B, a protrusion 654 of the loop fitting 652 is configured to couple to the coupling mechanism 660 and be disposed between the arcuate slot 1002 of the coupling mechanism 660 and the housing 610 of the TDU 600 as illustrated in FIGS. 12A and 12B, in accordance with various embodiments. Once coupled to an adjacent TDU, the cable 650 may be unwound based on a longitudinal length of a respective ULD and used to clamp the ULD and/or provide additional pulling force for translating the ULD.

Figure 13:
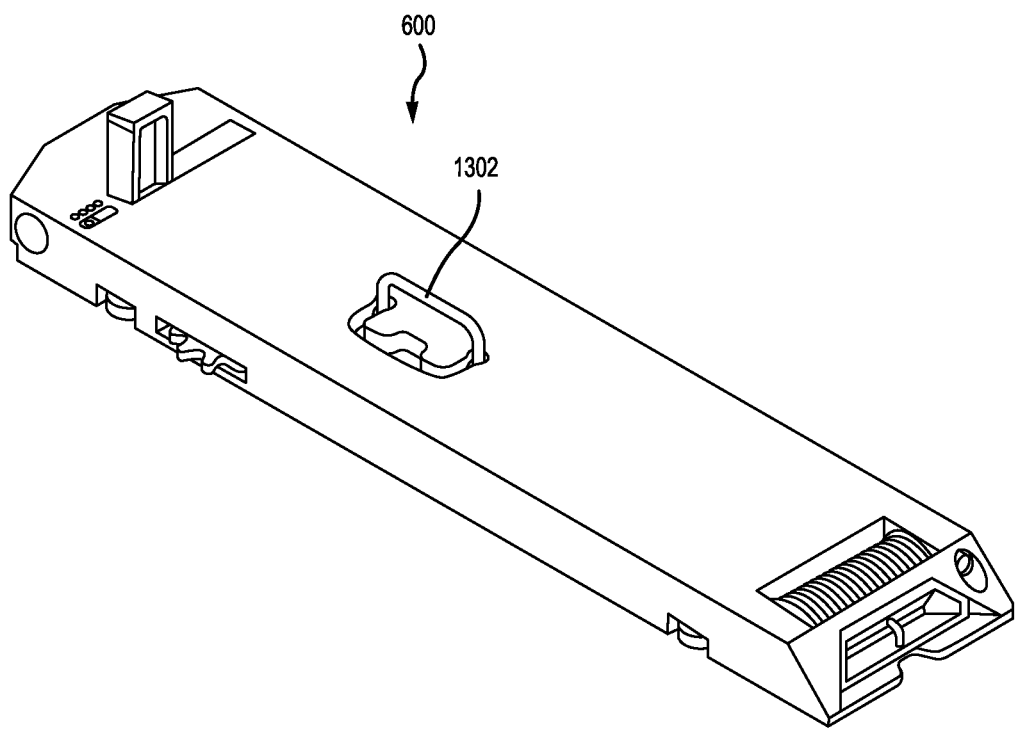
FIG. 13 illustrates a perspective view of a TDU, in accordance with various embodiments.

Referring now to FIG. 13, the TDU 600 having a carrying handle 1302 is illustrated, in accordance with various embodiments. The carrying handle 1302 may be configured to allow an individual to remove the TDU 600 from a cargo deck after loading. For example, the TDUs disclosed herein may be removeable from the cargo handling system (e.g., cargo handling system 100 from FIG. 2). In this regard, the TDUs may allow for additional weight to be disposed on an aircraft, since the weight of the TDUs would not be included during transport of cargo. In contrast, PDUs of typical cargo handling systems are fixed and/or add to the weight of a typical cargo handling system.

Figure 14:
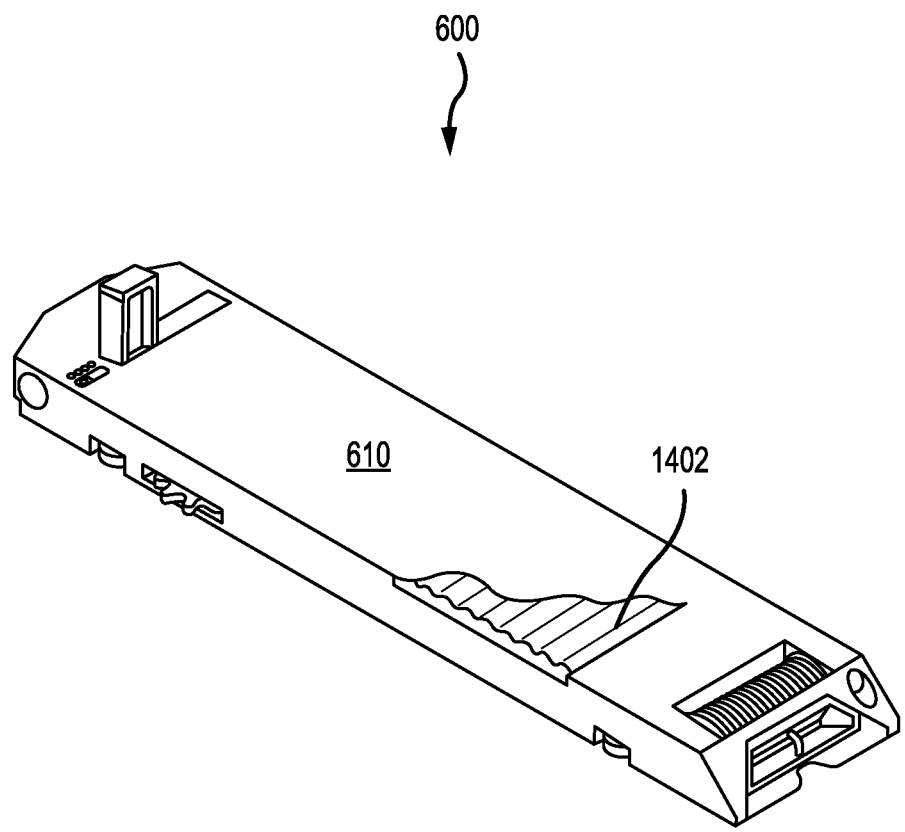
FIG. 14 illustrates a perspective view of a TDU with a portion of the housing hidden for clarity, in accordance with various embodiments.

Referring now to FIG. 14, a perspective view of the TDU 600 is illustrated with a portion of the housing 610 not shown for clarity in accordance with various embodiments. In various embodiments, the TDU includes a power source (e.g., a plurality of cells 1402). Although illustrates as including a plurality of cells 1402 defining a battery for the TDU 600, the present disclosure is not limited in this regard. For example, the power source may include a supercapacitor, a capacitor, or the like, in accordance with various embodiments.

Figure 15:
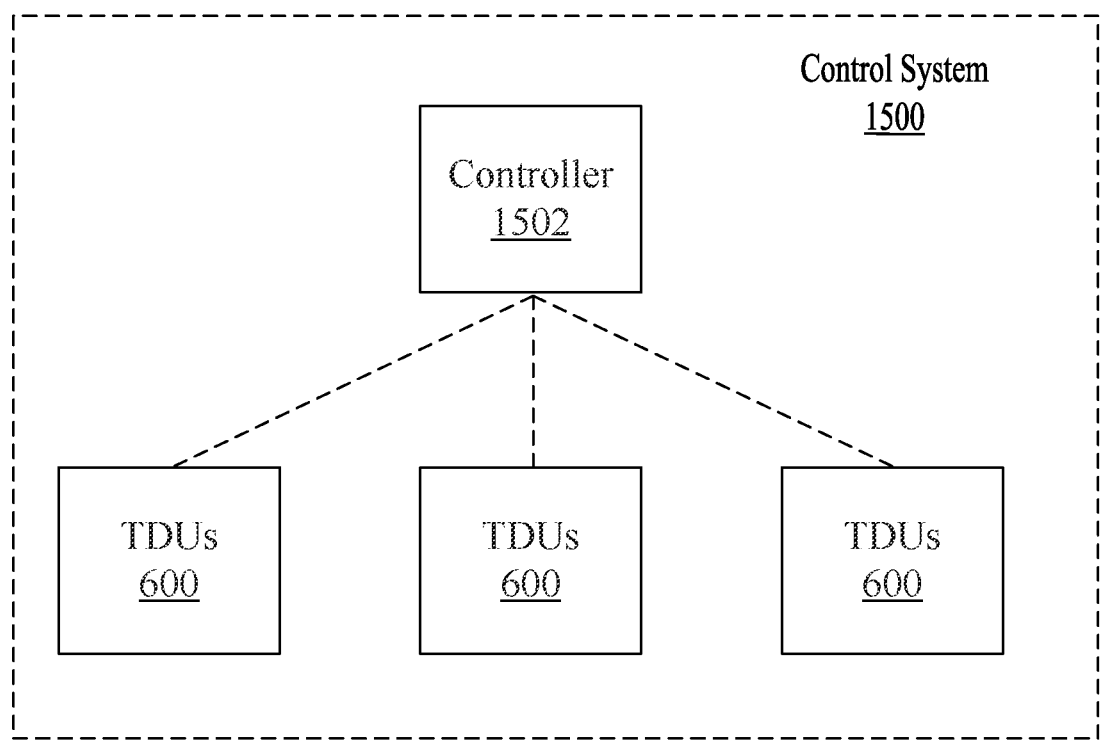
FIG. 15 illustrates a control system for a translating drive system, in accordance with various embodiments.

Referring now to FIG. 15, a control system 1500 for a translating drive system (e.g., translating drive system 200 from FIG. 2, is illustrated, in accordance with various embodiments. In various embodiments, the control system 1500 may comprise a controller 1502 and a plurality of TDUs 600. The controller 1502 may be in electronic communication with the plurality of TDUs 600 by any method known in the art.

In various embodiments, controller 1502 may be configured as a central network element or hub to access various systems and components of control system 1500. In various embodiments, controller 1502 may comprise a processor. In various embodiments, controller 1502 may be implemented in a single processor. In various embodiments, controller 1502 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 1502 may comprise a processor configured to implement various logical operations in response to execution of instructions, for example, instructions stored on a non-transitory, tangible, computer-readable medium configured to communicate with controller 1502.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 1502 may be configured to provide instructions to the plurality of TDUs 600. In this regard, the controller 1502 may command a first TDU (e.g., first TDU 210 from FIG. 2) to translate a first ULD to a first location of a cargo compartment (e.g., an aft end of a respective cargo compartment). In various embodiments, a second TDU (e.g., second TDU 220) may be instructed to translate a second ULD to a second location of a respective cargo compartment, or to combine with the first TDU to translate the first ULD, as disclosed previously herein, in accordance with various embodiments. In various embodiments, the plurality of TDUs 600 may be configured to communicate with the controller and/or other TDUs in a respective translating drive system (e.g., translating drive system 200 from FIG. 2). Although illustrated as including a main controller 1502, the present disclosure is not limited in this regard. For example, a control system may include only a plurality of autonomous TDUs configured to communicate with each other remotely for loading and unloading of ULDs.

Figure 16:
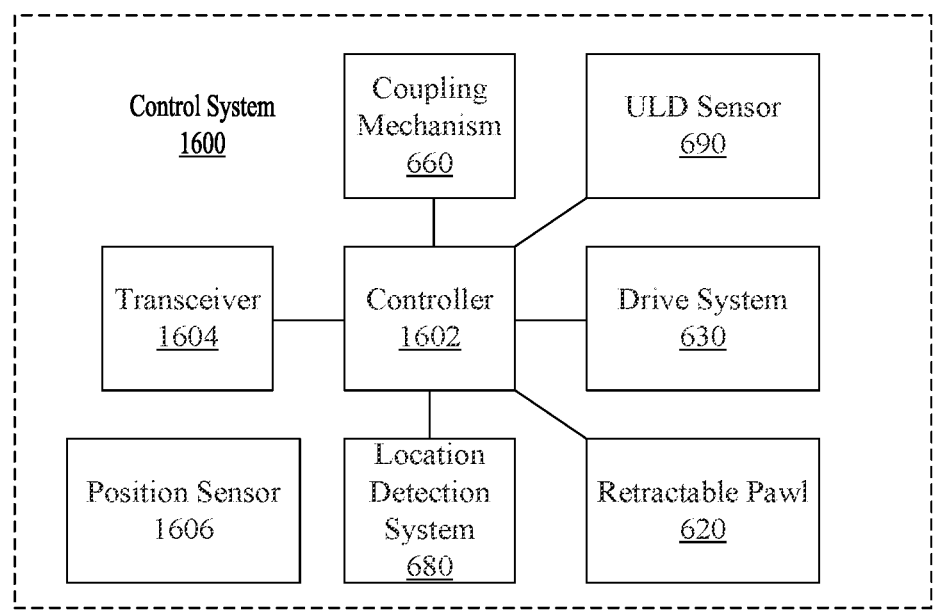
FIG. 16 illustrates a control system for a TDU, in accordance with various embodiments.

Referring now to FIG. 16, a control system 1600 for a TDU in the plurality of TDUs 600 of a translating drive system (e.g. translating drive system 200 from FIG. 2), is illustrated in accordance with various embodiments. The control system 1600 may include a controller 1602, a transceiver 1604, the retractable pawl 620, the drive system 630, the coupling mechanism 660, the location detection system 680, a ULD sensor 690, and a position sensor 1606. With brief reference to FIG. 6, the ULD sensor 690 may be disposed on the first surface 614 (e.g., a top surface) of the housing 610. In various embodiments, the TDU 600 may further include status indicators 692 disposed on the first surface 614 configured to indicate a power source status of the TDU 600 as illustrated in FIG. 6.

In various embodiments, controller 1602 may be configured as a central network element or hub to access various systems and components of control system 1600. In various embodiments, controller 1602 may comprise a processor. In various embodiments, controller 1602 may be implemented in a single processor. In various embodiments, controller 1602 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 1602 may comprise a processor configured to implement various logical operations in response to execution of instructions, for example, instructions stored on a non-transitory, tangible, computer-readable medium configured to communicate with controller 1602.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 1602 is in electronic communication with a transceiver 1604. The transceiver 1604 may be in electronic communication with the controller 1502 by any method known in the art, such as via a network, a router, or the like. In various embodiments, the transceiver 1604 may receive instructions from the controller 1502 of the control system 1500 for the translating drive system 200 from FIG. 2 and send the received instructions to the controller 1602 of the control system 1600 for a respective TDU 600. In various embodiments, the transceiver 1604 may further send status information received from controller 1602 with regards to a position of a respective TDU (e.g., from location detection system 680), whether a ULD is disposed above the TDU (e.g., from the ULD sensor 690), whether an additional TDU is needed to translate a respective ULD (e.g., from the location detection system 680 remaining the same), or the like.

In various embodiments, the controller 1602 may send instructions to the coupling mechanism 660 to open to receive a loop fitting (e.g., loop fitting 652), as described previously herein. In various embodiments, the controller 1602 may instruct drive system 630 to translate longitudinally along a respective cargo deck (e.g., cargo deck 12 from FIG. 1A) in response to a ULD being disposed above the TDU (received from the ULD sensor 690) and the retractable pawl 620 being in an extracted position.

In various embodiments, the controller 1602 may be configured to extract and retract the retractable pawl 620. In various embodiments, the controller 1602 may send instructions to the retractable pawl 620 to be extracted prior to use in translating a respective ULD and/or instruct the retractable pawl 620 to retract when not in use, or when the retractable pawl is not being used to translate a respective ULD via the retractable pawl 620 for the respective TDU.

In various embodiments, the controller 1602 is in electronic communication with the position sensor 1606. In various embodiments, the position sensor 1606 may be configured to provide position data relative to the rest of a cargo compartment (e.g., cargo compartment 14 from FIG. 1A) and/or have the ability to determine foreign object debris on a cargo deck (e.g., cargo deck 12 from FIG. 1A). In various embodiments, the position sensor 1606 and the ULD sensor 690 may be utilized in combination by the controller 1602 to determine a velocity of the respective TDU, to determine if the TDU is moving relative to the compartment, and/or to determine if a ULD is moving relative to the TDU.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A translating drive unit (TDU), comprising:
    a housing;
    a plurality of guide rollers coupled to the housing;
    a drive system coupled to the housing, the drive system configured to translate the housing in a longitudinal direction;
    a retractable pawl coupled to the housing; and
    a first cable disposed at a first longitudinal end of the housing.

2. The TDU of claim 1, wherein the drive system includes:
    a first gear extending outward from a first lateral side of the housing, and
    a second gear extending outward from a second lateral side of the housing.

3. The TDU of claim 2, wherein the plurality of guide rollers includes a first vertical roller disposed on the first lateral side of the housing, a second vertical roller disposed on the second lateral side of the housing, and a first horizontal roller disposed between the first vertical roller and the second vertical roller.

4. The TDU of claim 3, wherein the plurality of guide rollers further comprises:
    a third vertical roller disposed on the first lateral side of the housing and spaced apart longitudinally from the first vertical roller;
    a fourth vertical roller disposed on the second lateral side of the housing and spaced apart longitudinally from the second vertical roller; and
    a second horizontal roller spaced apart longitudinally from the first horizontal roller.

5. The TDU of claim 1, further comprising a power source disposed within the housing.

6. The TDU of claim 5, wherein the power source is plurality of cells disposed within the housing.

7. The TDU of claim 1, wherein the retractable pawl is pivotably coupled to the housing.

8. The TDU of claim 1, further comprising a coupling mechanism disposed at a second longitudinal end of the housing, the coupling mechanism configured to couple the TDU to a second cable of an adjacent TDU.

9. A translating drive unit (TDU), comprising:
    a housing;
    a drive system operably coupled to the housing;
    a retractable pawl operably coupled to the housing;
    a sensor coupled to the housing, the sensor comprising at least one of a unit load device sensor disposed on a surface of the housing and a light detection and ranging (LiDAR) sensor;
    a controller operable to:
        command the drive system to translate the TDU longitudinally along a cargo compartment; and
        command the retractable pawl to transition from a retracted state to an extended state, the extended state having the retractable pawl disposed vertically above the surface of the housing.

10. The TDU of claim 9, wherein the controller is further operable to receive from the ULD sensor an indication whether a ULD is disposed above the TDU.

11. The TDU of claim 9, wherein the drive system comprises a first gear extending outward from a first lateral side of the housing and a second gear extending outward from a second lateral side of the housing.

12. The TDU of claim 11, wherein the controller is further operable to command the first gear and the second gear to rotate and translate the TDU longitudinally along the cargo compartment.

13. A translating drive unit (TDU), comprising:
    a housing;

a coupling mechanism disposed at a first longitudinal end of the housing and a cable disposed at a second longitudinal end of the housing;
a drive system operably coupled to the housing;
a retractable pawl operably coupled to the housing; and
a controller operable to:
command the drive system to translate the TDU longitudinally along a cargo compartment and
command the retractable pawl to transition from a retracted state to an extended state, the extended state having the retractable pawl disposed vertically above a surface of the housing.

14. The TDU of claim 13, wherein the controller is further operable to command the coupling mechanism to actuate to couple the TDU to an adjacent TDU.

15. A translating drive system for a cargo handling system, comprising:
a first roller tray having a first plurality of rollers disposed therein, the first roller tray extending longitudinally through a cargo compartment;
a second roller tray having a second plurality of roller disposed therein, the second roller tray spaced apart laterally from the first roller tray;
a first translating drive unit (TDU) disposed between the first roller tray and the second roller tray, the first TDU having a first retractable pawl configured to extend above a first surface of a housing of the TDU, the first TDU including a first drive system configured to translate the first TDU longitudinally through the cargo compartment; and
a second TDU disposed between the first roller tray and the second roller tray and spaced apart longitudinally from the first TDU, the second TDU including a second retractable pawl configured to extend above a second surface of the housing of the first TDU, the second TDU including a second drive system configured to translate the second TDU longitudinally through the cargo compartment, wherein the first TDU is configured to couple to the second TDU via a coupling mechanism and cable.

16. A translating drive system for a cargo handling system, comprising:
a first roller tray having a first plurality of rollers disposed therein, the first roller tray extending longitudinally through a cargo compartment;
a second roller tray having a second plurality of roller disposed therein, the second roller tray spaced apart laterally from the first roller tray;
a first translating drive unit (TDU) disposed between the first roller tray and the second roller tray, the first TDU having a first retractable pawl configured to extend above a first surface of a housing of the TDU, the first TDU including a first drive system configured to translate the first TDU longitudinally through the cargo compartment and
a second TDU disposed between the first roller tray and the second roller tray and spaced apart longitudinally from the first TDU, the second TDU including a second retractable pawl configured to extend above a second surface of the housing of the first TDU, the second TDU including a second drive system configured to translate the second TDU longitudinally through the cargo compartment, wherein the first TDU includes a first transceiver and the second TDU includes a second transceiver.

17. The translating drive system of claim 16, further comprising a main controller, wherein the first TDU is configured to receive instructions through the first transceiver from the main controller, and wherein the second TDU is configured to receive instructions through the second transceiver from the main controller.

* * * * *